United States Patent Office 3,300,235
Patented Jan. 24, 1967

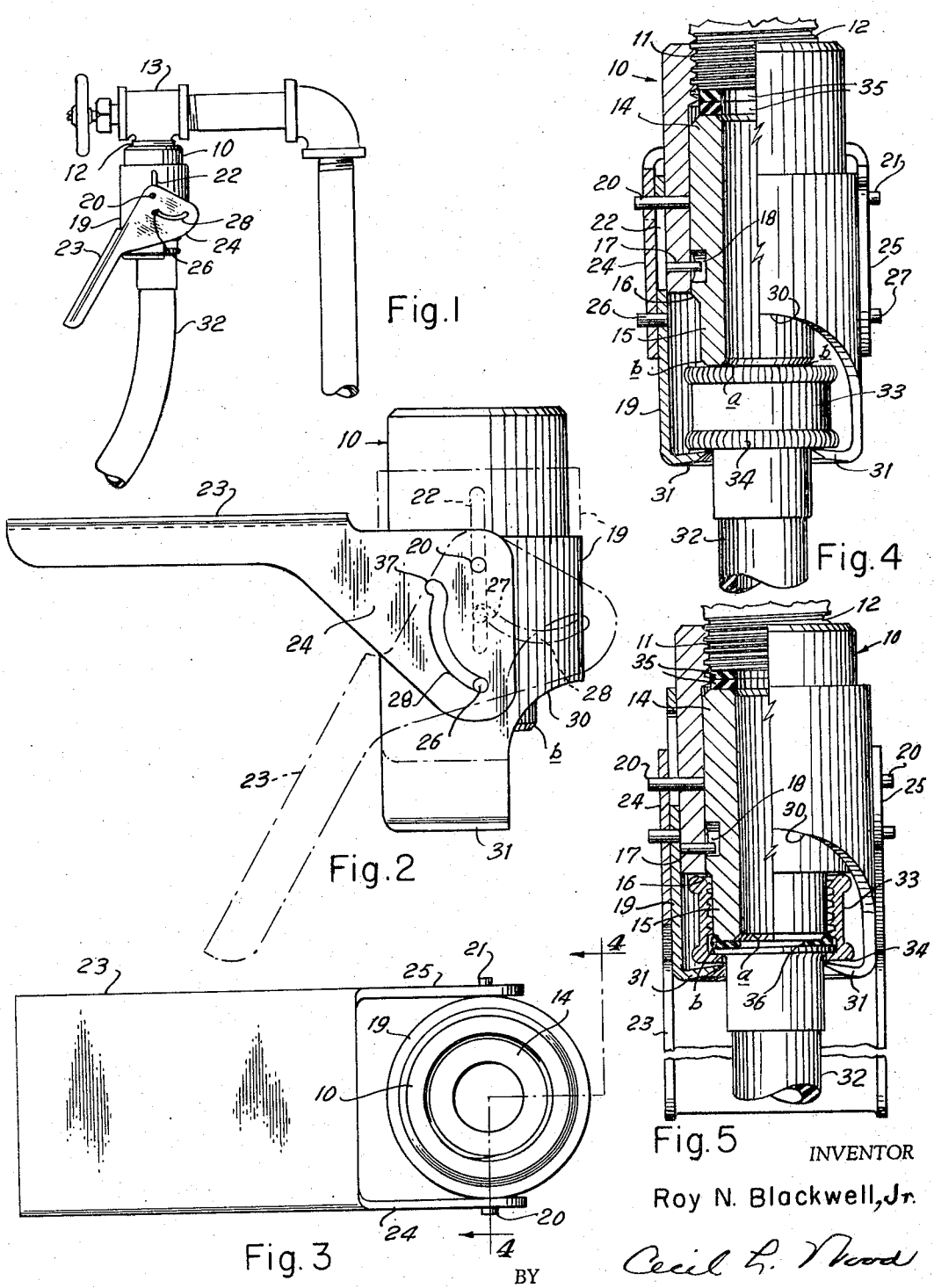

3,300,235
HOSE COUPLING DEVICE
Roy N. Blackwell, Jr., 9450 Highedge,
Dallas, Tex. 75238
Filed May 13, 1964, Ser. No. 367,116
5 Claims. (Cl. 285—312)

This invention relates to coupling devices for water hose, and it has particular reference to couplers by which a length of hose can be readily attached to a water faucet or to another length of hose without conventionally threading the same, and the principal object of the invention resides in the provision of a coupling device which is adapted to be threadedly attached to a water faucet having a hose bib, or to the male coupling of a length of hose, as a permanent fixture, if desired, and afford means by which a hose section can be detachably clamped thereto.

A further object of the invention is that of providing a coupling device which can be threadedly attached to the hose bib of a faucet, and function as a coupler for a section of hose, without interfering with the normal function of the faucet.

Broadly, the invention contemplates the provision of a hose coupling device which is simple and economical in structure and design, and by which a hose can be detachably secured thereto with a minimum effort.

The invention is related to that described in applicant's copending application, Serial No. 134,308, filed August 28, 1961.

While the foregoing objects are paramount, other and lesser objects will become apparent as the description proceeds, when considered with the appended drawings wherein:

FIGURE 1 is an elevational view of the invention shown attached to a conventional water faucet and having a section of hose connected thereto, the latter being fragmentarily shown.

FIGURE 2 is an enlarged side elevational view of the invention detached from a faucet, the position of the lever in attached position being shown in broken lines.

FIGURE 3 is a plan view of the invention as illustrated in FIGURE 2.

FIGURE 4 is an illustration, partially in section on line 4—4 of FIGURE 3, showing the invention threadedly attached to a hose bib of a faucet and showing the female coupling of a hose suspended thereon, the faucet and hose being fragmentarily shown, and FIGURE 5 is another illustration, partially in section similar to FIGURE 4, showing the hose clamped to the coupler, the female coupling of the hose being shown in section.

Accordingly, the invention primarily comprises a cylindrical body 10 which has internal threads 11 formed in one end whereby the device can be threadedly attached to the hose bib 12 of a faucet 13, in the manner shown in FIGURES 1, 4 and 5. Concentrically arranged internally of the body 10, and capable of limited longitudinal movement therein, is a cylindrical sleeve 14 whose lower end 15 is reduced in diameter defining an obtuse annular shoulder 16 spaced from its lower end which is chamfered internally and externally as to a and b.

The sleeve 14 is retained within the body 10 by a pin 17 arranged in a wall of the body 10 and extending inwardly thereof into a circular cavity 18 in the outer surface of the sleeve 14, as shown in FIGURES 4 and 5. By this arrangement the sleeve 14 is capable of limited longitudinal movement in the body 10, as will become apparent as the description proceeds.

An outer cylindrical shell 19 slidably embraces the body 10 and is retained thereon by pins 20 and 21, secured in opposing sides of the body 10 and project outwardly, as shown in FIGURES 3, 4 and 5, through slots 22 formed longitudinally in opposing sides of the shell 19 whereby the latter is capable of limited longitudinal movement on the body 10.

A lever 23, having a pair of spaced cam members 24 and 25 formed therewith, is pivotally secured to the body 10 by the pins 20 and 21 externally of the shell 19 which has a pair of pins 26 and 27 extending from opposing sides thereof and through arcuate slots 28 in each of the cam members 24 and 25 of the lever 23 so that when the latter is urged downwardly in its operative position, shown in FIGURE 1, or in broken lines in FIGURE 2, the shell 19 is moved upwardly on the body 10 to clamp the hose 29 to the assembly, in the manner shown in FIGURES 1 and 5.

The shell 19 has an arcuate recess 30 formed in the lower portion thereof opposite lever 23 so that the lower end of this member is semi-circular and has an internal flange 31 which is tapered toward its inner periphery and has a slight upward inclination, as shown in FIGURES 4 and 5. Such an arrangement affords means by which a section of hose 32 can be detachably secured to the coupling by inserting the internally threaded female coupling member 33 into the shell 19 through the recess 30 so that its annular base 34 is supported on the flange 31 and the coupling member 33 is beneath and concentrically of the lower end 15 of the sleeve 14, as shown best in FIGURE 4. In this position the lever 23 is in its uppermost position, as shown in FIGURE 2.

The invention, in operation, is first applied to the faucet 13 by threading the upper end of the body 10 to the hose bib 12, one or more gaskets 35 being arranged on the upper end of the sleeve 14 to provide a suitable seal between the bib 12 and the member 14, as apparent in FIGURES 4 and 5. The lever 23 is depressed to its locked position, shown in FIGURES 1 and 5, and in broken lines in FIGURE 2, whereby the coupling member 33 is moved upwardly about the lower end 15 of the sleeve 14 and secured in position. A gasket 36 is arranged in the member 33 to provide a seal, as shown in FIGURE 5.

The arcuate slots 28 in the cam members 24 and 25 of the lever 23 are formed with recesses 37 at their inner ends into which the pins 26 and 27 enter when the lever 23 is in its locked position, as shown in broken lines in FIGURE 2. This arrangement prevents the involuntary detachment of the house coupling 33 and insures rigidity of the coupling assembly.

It is, of course, obvious that the body 10 can be threadedly attached to the male coupling member (not shown) of a section of hose whereby two hose sections can be detachably coupled, if desired. It is also apparent that certain changes and modifications in structure and design may be resorted to without departing from the spirit and intent of the invention or the scope of the appended claims.

What is claimed is:

1. A detachable coupler for water hose, in combination with a faucet having a hose bib and a section of hose, a cylindrical body having an internal threaded portion on one end, a cylindrical sleeve arranged concentrically of said body and lost motion means connecting said body and said sleeve permitting limited longitudinal movement of said sleeve within said body, the said sleeve having a portion reduced in diameter extending beyond the end of said body opposite the internal threaded portion thereof to be embraced by the female coupling of said section of hose, and a cylindrical shell slidably connected to said body and embracing the reduced portion of said sleeve and having an opening in one end and an opening in the cylindrical wall adjacent said end whereby to receive said female hose coupling in concentric alignment with said sleeve, said shell having an internal flange formed about a portion of said one end to engage said hose coupling, and cam means interconnecting said shell and said body for moving said shell axially.

2. A coupling device for attaching a water hose to a hose bib, the said hose having an internally threaded socket on one end, in combination with said hose and said hose bib, a cylindrical body having internal threads on one end for threaded securement to said hose bib, a cylindrical sleeve in said body and lost motion means connecting the sleeve thereto permitting limited longitudinal movement in said body, the said sleeve having a reduced portion extending beyond said body opposite the internally threaded portion thereof providing a spigot portion to be embraced by said socket, a cylindrical shell slidably connected to said body and embracing said spigot portion of said sleeve, the said shell having an opening in one end and an opening in the cylindrical wall adjacent said one end whereby to receive said socket therein, an internal peripheral flange formed about a portion of the open end of said shell for concentrically supporting said socket therein, and cam means interconnecting said shell and said body for moving said shell axially to connect said hose socket to the spigot portion of said sleeve.

3. In a coupling device for attaching a water hose to a hose bib, the said hose having an internally threaded socket on one end, in combination, a cylindrical body having an internally threaded portion on one end for threaded attachment to said hose bib, a cylindrical sleeve arranged concentrically within said body and lost motion means connecting the sleeve thereto, the said sleeve having a reduced portion extended from said body opposite the internally threaded portion thereof to be embraced by the socket on said hose, a cylindrical shell connected to said body and slidably embracing the reduced portion of said sleeve, the said shell being open at one end and having an internal flange formed about a portion of its open end, the said shell having an opening on one side adjacent to its open end to receive said socket, and cam means interconnecting said body and said shell for moving said shell axially to connect said sleeve and said hose socket in rigid association with said body and said hose bib.

4. In a coupling device as described in claim 1, the said cam means comprising a lever pivoted to said body and having portions embracing opposing sides of said shell, each having an arcuate slot therein, and a pin on each side of said shell engaging said arcuate slots whereby to move said shell axially of said body when said lever is manipulated.

5. In a device for coupling a hose to a hose bib, as described in claim 2, the said body having a pin extending from opposing sides thereof and the said shell having longitudinal slots on opposing sides to receive said pins, and a lever pivotally attached to said pins having said cam means formed therewith, the said shell having pins on opposite sides thereof extending through arcuate slots in said cam means.

References Cited by the Examiner
UNITED STATES PATENTS

| | | | |
|---|---|---|---|
| 415,273 | 11/1889 | Houston | 285—331 X |
| 559,911 | 5/1896 | Sheridan | 285—326 |
| 954,348 | 4/1910 | Schaefer | 285—326 |
| 1,481,392 | 1/1924 | Schawrow | 285—312 X |
| 1,880,853 | 10/1932 | Davis | 285—101 |
| 2,460,833 | 2/1949 | Lamb | 285—312 |
| 2,482,175 | 9/1949 | Hamilton | 285—312 |
| 2,754,135 | 7/1956 | Kramer | 285—101 |

CARL W. TOMLIN, *Primary Examiner.*

T. A. LISLE, *Assistant Examiner.*